(12) United States Patent
Berglund

(10) Patent No.: US 8,223,721 B2
(45) Date of Patent: Jul. 17, 2012

(54) MOBILE STATION HANDOVER USING TRANSFERRABLE VIRTUAL ACCESS POINT ADDRESS FOR WIRELESS NETWORKS

(75) Inventor: Jan Erik Johan Berglund, Cupertino, CA (US)

(73) Assignee: Nokia Siemens Networks Oy, Espoo (FI)

( * ) Notice: Subject to any disclaimer, the term of this patent is extended or adjusted under 35 U.S.C. 154(b) by 744 days.

(21) Appl. No.: 12/277,938

(22) Filed: Nov. 25, 2008

(65) Prior Publication Data
US 2009/0141685 A1 Jun. 4, 2009

Related U.S. Application Data

(60) Provisional application No. 60/991,210, filed on Nov. 29, 2007.

(51) Int. Cl.
*H04W 4/00* (2009.01)
(52) U.S. Cl. ....................................................... 370/332
(58) Field of Classification Search .................. 370/331, 370/332, 310, 312, 329, 342, 345, 438, 338, 370/351, 357, 389, 328; 455/436, 438, 509, 455/515
See application file for complete search history.

(56) References Cited

U.S. PATENT DOCUMENTS 7,577,434 B2 * 8/2009 Nakano et al. ................ 455/436
7,889,713 B2 * 2/2011 Zheng et al. .................. 370/351
2002/0167965 A1 11/2002 Beasley et al.
2006/0264212 A1 11/2006 Sekhar
2007/0189168 A1 8/2007 Yao

FOREIGN PATENT DOCUMENTS

WO 2009/073529 A1 6/2009

OTHER PUBLICATIONS

"International Application Serial No. PCT/US2008/084915, Search Report mailed Apr. 17, 2009", 25.
Garcia, Andrew "Meru Fine Tunes Wireless LANS", Meru Networks Inc/ Ziff Davis Enterprise Inc, (Sep. 13, 2004),1-2.
Nobel, Carmel "WiFi Security Doesn't Have to Mean Slow", Advertisement Airespace Inc/ Ziff Davis Enterprise Inc, (Aug. 9, 2004),1.

* cited by examiner

*Primary Examiner* — Chi Pham
*Assistant Examiner* — Alexander Boakye
(74) *Attorney, Agent, or Firm* — Brake Hughes Bellermann LLP

(57) ABSTRACT

Various example embodiments are disclosed herein. According to an example embodiment, an apparatus may include a wireless transceiver, memory and a controller. The apparatus may be configured to assign, by a first physical access point (AP), a unique transferrable virtual AP address to one associated mobile station address; and perform, in response to a network request for handover, a handover for the associated mobile station address including: transferring the transferrable virtual AP address assigned to the associated mobile station address from a first physical AP to a second physical AP; and providing association state information for the associated mobile station address to the second physical AP.

21 Claims, 6 Drawing Sheets

US 8,223,721 B2

MOBILE STATION HANDOVER USING TRANSFERRABLE VIRTUAL ACCESS POINT ADDRESS FOR WIRELESS NETWORKS

PRIORITY CLAIM

This Application claims the benefit of priority of U.S. Provisional Patent Application No. 60/991,210, filed Nov. 29, 2007, entitled "Mobile Station Handover Using Transferrable Virtual Access Point Address For Wireless Networks," which is hereby incorporated by reference.

TECHNICAL FIELD

This description relates to wireless networks.

BACKGROUND

Wireless networks typically offer at least basic communication services through an Access Point (AP) or other infrastructure node. For example, for some networks, a mobile wireless station (or subscriber station) may associate with an AP, and then perform authentication with the AP. In some cases, when a mobile station roams or moves to a new area, the mobile station and disassociate with the current AP, and may associate and perform authentication with a new AP that provides a stronger signal.

A number of new applications have been developed in recent years, such as, for example, streaming media, Voice over IP (VoIP), and other applications, that may be provided over wireless networks. However, some problems may arise when attempting to provide these types of services over wireless networks. For example, a brief service interruption (e.g., for VoIP service) may occur as a mobile station disassociates with a current AP and associates and authenticates with a new AP.

Also, in at least some wireless networks, handover decisions (e.g., when to handover a mobile station to a new AP, and to which new AP) are typically made by the mobile station. However, the mobile station typically has incomplete information regarding the network and this handover decisions by the mobile station may result in inefficient use of network resources or other problems. Improved operation may be desirable, at least in some cases.

SUMMARY

According to an example embodiment, a method may include transmitting a beacon for a transferrable virtual access point (AP) address, and assigning, by a first physical access point (AP), the transferrable virtual AP address to an associated mobile station address, the mobile station address identifying a mobile station. The method may also include performing a handover of the mobile station from the first physical AP to a second physical AP by the first physical AP performing the following: transferring the transferrable virtual AP address assigned to the associated mobile station address to the second physical AP; providing association state information for the associated mobile station address to the second physical AP; providing beacon timing information for the virtual AP address to the second physical AP; and discontinuing transmitting the beacon for the transferrable virtual AP address assigned to the mobile station address.

According to another example embodiment, a method may include assigning, by a first physical access point (AP), a unique transferrable virtual AP address to one associated mobile station address, and, performing, in response to a network request for handover, a handover for the associated mobile station address including: transferring the transferrable virtual AP address assigned to the associated mobile station address from a first physical AP to a second physical AP; and providing association state information for the associated mobile station address to the second physical AP.

According to another example embodiment, an apparatus may include a wireless transceiver, a memory and a controller or processor. The apparatus (e.g., the controller or processor) may be configured to assign, by a first physical access point (AP), a unique transferrable virtual AP address to one associated mobile station address; and perform, in response to a network request for handover, a handover for the associated mobile station address including: transferring the transferrable virtual AP address assigned to the associated mobile station address from a first physical AP to a second physical AP; and providing association state information for the associated mobile station address to the second physical AP.

In yet another example embodiment, a method may include receiving, at a second physical access point (AP) from a first physical AP, a transfer of a transferrable virtual AP address assigned to an associated mobile station address, receiving, at the second physical AP from the first physical AP, association state information for the associated mobile station address, receiving, at the second physical AP from the first physical AP, beacon timing information for the transferrable virtual AP address, transmitting by the second physical AP, at a time based on the received beacon timing information, a beacon for the transferrable virtual AP address assigned to the mobile station address, and, maintaining, by the second physical AP, the association of the mobile station with the transferrable virtual AP address.

In yet another example embodiment, a method may include allocating (e.g., by a network controller 112) a transferrable virtual AP (Access Point) address to a first physical (AP), the transferrable virtual AP address assigned (or being assigned) to an associated mobile station address, transferring the transferrable virtual AP address assigned to the associated mobile station address to a second physical AP, and providing association state information for the associated mobile station address to the second physical AP.

The details of one or more implementations are set forth in the accompanying drawings and the description below. Other features will be apparent from the description and drawings, and from the claims.

DETAILED DESCRIPTION

Figure 1:
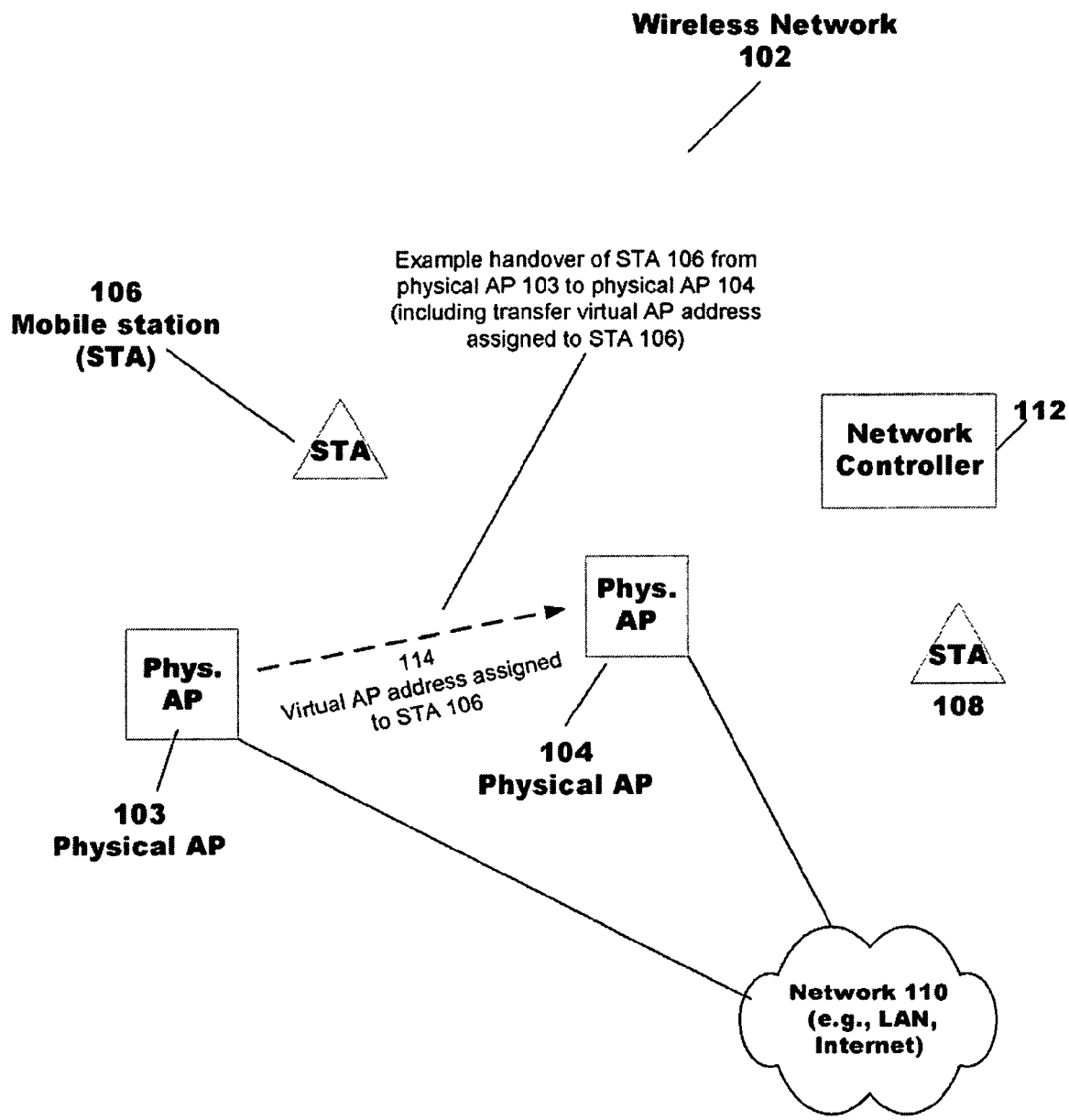
FIG. 1 is a block diagram of a wireless network according to an example embodiment.

Referring to the Figures in which like numerals indicate like elements, FIG. 1 is a block diagram illustrating a wireless network according to an example embodiment. Wireless network 102 may include a number of wireless nodes such as one or more physical wireless access points (APs) and one or more mobile stations (STA). The physical APs may include, for example, physical APs 103 and 104. Mobile stations (STA) 106 and 108 may be provided, for example. Although only two physical APs and two mobile stations are shown in the network 102 of FIG. 1, any number of APs or mobile stations may be used.

The physical APs 103 and 104 may include AP hardware (and possibly firmware or software). In a conventional AP or network, an AP may typically be identified by its static (or fixed) MAC (media access control) address. However, according to an example embodiment, an AP address (e.g., MAC address) used by each physical AP 103, 104, . . . in network 102 (FIG. 1) may vary or change over time, and a different AP address may be used for association with each mobile station. Also, to provide a more transparent handover to the mobile station, the AP addresses associated with each mobile station may be transferred between physical APs. Thus, in an example embodiment, the AP addresses used by physical APs 103, 104, . . . may be referred to herein as transferrable virtual AP addresses.

A network controller 112 may be coupled to physical APs 103, 104, etc., via wireless links or wired links (e.g., Ethernet links, Optical links or other wired links). Network controller 112 may communicate with the physical APs, and may, in an example embodiment, perform network control, access control, handover or roaming decisions, assign or allocate virtual AP addresses to the various physical APs, and/or other functions.

The various embodiments described herein may be applicable to a wide variety of networks and technologies, such as WLAN networks (e.g., IEEE 802.11 type networks), IEEE 802.16 WiMAX networks, WiMedia networks, Ultra Wide Band networks, cellular networks, radio networks, or other wireless networks. In another example embodiment, the various examples and embodiments may be applied, for example, to a mesh wireless network, where a plurality of mesh points (e.g., Access Points) may be coupled together via wired or wireless links.

The term Access Point (AP) may refer to any type of infrastructure node, such as an AP, base station, node B, relay station, mesh point, etc. A mobile station may include any type of mobile station or subscriber station, such as wireless handset, PDA (wireless personal digital assistant), cell phone, an IEEE 802.11 WLAN (wireless local area network) phone, a WiMedia device, an IEEE 802.16 WiMAX device or other wireless mobile device. These are merely a few examples of the wireless devices and technologies that may be used to implement the various embodiments described herein, and this disclosure is not limited thereto.

In an example embodiment, each physical AP may transmit (e.g., broadcast) a beacon for a transferrable virtual AP address that is not currently assigned (e.g., not associated with) any mobile station. The beacon may include or identify, for example, the transferrable virtual AP address, a BSSID (basic service set ID) or network ID that may be associated with the virtual AP address, one or more capabilities of the physical AP (or one or more features/capabilities supported by the physical AP), possibly an indication of whether data will be transmitted to specific mobile stations during a next frame or transmission period, and possibly other information. Each (or one or more) physical AP within network 102 may transmit a beacon for at least one transferrable virtual AP address (e.g., different virtual AP addresses for each physical AP). Each physical AP 103, 104, may obtain or determine a virtual AP address to beacon (as being available for association) and use for a new association, from a pool of addresses assigned to each physical AP, or by requesting a new AP address from network controller 112, or other mechanism, for example.

For example, physical AP 103 may transmit a beacon for transferrable virtual AP (e.g., MAC) address X (where the virtual AP address X is not currently associated with any mobile station in network 102). Mobile station 106 (having a mobile station MAC address Z) may send an association request addressed to virtual AP address X (that was beaconed by physical AP 103). Physical AP 103 may respond by sending an association response to mobile station 106 (e.g., specifically to the address Z of mobile station 106). In this manner, address Z of mobile station 106 may be associated with transferrable virtual AP address X. Authentication may also be performed between physical AP 103 and mobile station 106 (e.g., between virtual AP address X and mobile station address Z).

Also, based on this association between virtual AP address X and mobile station address Z, physical AP 103 may uniquely assign virtual AP address X to mobile station address Z. In an example embodiment, by this assignment, this virtual AP address X will be used (within network 102) only for the association with mobile station 106 (or for association to address Z of mobile station 106), and different virtual AP addresses may be used by physical AP 103 for associations with other mobile stations (e.g., one virtual AP address for each associated mobile station or mobile station address).

After the physical AP 103 has associated virtual AP address X with mobile station 106 (or more specifically with mobile station address Z), physical AP 103 may continue to periodically transmit a beacon for virtual AP address X, but, for example, the beacon may hide (or not transmit) the network ID or BSSID, e.g., so that other mobile stations do not attempt to associate with this virtual AP address X. Also, the physical AP 103 may typically decline any association requests to the assigned virtual AP address X from other mobile stations so long as this virtual AP address is assigned to mobile station address Z (and is used by physical AP 103), for example. This will allow each virtual AP address to be associated with one (e.g., only one) mobile station at a time, according to an example embodiment.

Mobile station 106 may roam or move location. A handover request may be provided from mobile station 106, or from the network (such as from one or more physical APs, or from network controller 112). A handover request may be based on, for example, received signal strength measurements, e.g., signals measured by one or more APs from the mobile station 106, or signal strength measured by mobile station 106 based on signals from one or more APs, or other mechanism. For example, by allowing network controller (and/or physical APs) to determine when to handover mobile station 106 and to which new physical AP handover should be provided to, a more appropriate or more efficient use of AP resources or network resources may be achieved, for example.

The handover of mobile station 106 from physical AP 103 to physical AP 104 (as an example) may include a number of tasks, such as (for example): transferring virtual AP address X and the corresponding BSSID or network ID from physical AP 103 to physical AP 104, as indicated by line 114 in FIG. 1 (transfer of virtual AP address assigned to STA 106). By this transfer of virtual AP address X, the physical AP 103 may relinquish use of the virtual AP address X (and corresponding network ID), which allows physical AP 104 to use this address, e.g., for beaconing and data transfer.

The handover may also include or involve physical AP 103 providing association state information (describing or related to the association between virtual AP address X and mobile station address Z) to physical AP 104. The association state information may include, for example, one or more capabilities of the mobile station (or negotiated capabilities) such as multimedia extension, supported modulation schemes or coding rates, power save mode capability, support for various other wireless standards or extensions, such as 802.11g or 802.11a, 802.11n, etc., authentication credentials, and one or more security keys (e.g., used for data transmission), etc.

The handover may also include, for example, physical AP 103 providing beacon timing information to physical AP 104 for the beacon transmitted for the virtual AP address X. This may allow physical AP 104, after the handover, to transit the beacon for virtual AP address X at approximately the time or within a range of times that mobile station may be expecting to receive this beacon. This may be useful, for example, for power save mode, where a mobile station may receive a beacon and (based on information in the beacon) determine if data will be transmitted to the mobile station in a next (or later) transmission period, so that a decision to go back to power save mode can be made by the mobile station. The handover may also involve the current physical AP 103 discontinuing transmission of the beacon for the virtual AP address X that is assigned to the mobile station address Z. This will allow the new physical AP 104 to begin transmitting the beacon for the virtual AP address X after handover.

After the handover, the association and/or authentication between the virtual AP address X and mobile station address Z may be maintained (e.g., association maintained without necessarily needing to perform re-association and re-authentication for the mobile station 106 by physical AP 104). This may decrease the service interruption for the mobile station 106 as it moves. In fact, there may be no service interruption, and the handover may be transparent (or go undetected) to the mobile station 106, for example. Data to be sent to the mobile station 106 may be forwarded or re-routed to the new physical AP 104 (e.g., by network controller 112). After the handover, the new physical AP 104 may begin transmitting data to and receiving data from the mobile station 106 based on the association state information provided by physical AP 103, e.g., using the security key and a supported modulation scheme/coding rate indicated by the association state information, and using the virtual AP address X (e.g., as the source MAC address for such data transmissions). Also, the new physical AP 104 may begin transmitting the beacon for the virtual AP address X, e.g., approximately the time indicated by the beacon timing information provided by the physical AP 103.

For example, if the same channel (or frequency or subcarrier) is used by new physical AP 104 as used by physical AP 103 for communication with mobile station 106, then the handover to physical AP 104 may be transparent to mobile station 106, except for a change in transmission power, for example, since the new physical AP 104 may typically be closer to the mobile station 106 (than physical AP 103) after the handover.

This handover may include or involve physical AP 103 discontinuing use of virtual AP address X for beaconing and data transfer. In an example embodiment, physical AP 103 may determine a new virtual AP address to be used for beaconing. For example, physical AP 103 may select an AP address from a pool of addresses, or may request and obtain a new virtual AP address from network controller 112, for example. Physical AP 103 may then transmit a beacon for the new virtual AP address, where the new virtual AP address may be assigned to a different mobile station (or different mobile station address) upon association between the different mobile station and the new virtual AP address. In this manner, physical AP 103 may beacon at least one available or free virtual AP address, which may be available for association to another wireless station, along with beacons for one or more associated mobile station.

A wireless node may disassociate or send a disassociation request to a physical AP for an assigned virtual AP address. After disassociation, the corresponding virtual AP address may be re-used by the physical AP, or may be reallocated back in a pool of addresses maintained by network controller 112, for example.

For example, after performing handover to physical AP 104, the wireless node 106 may request disassociation with the virtual AP address X (now beaconed and used by physical AP 104). This may occur, e.g., if a different channel is used for the new physical AP (such as were mobile station may detect a change in channels). In such a case, the physical AP 104 may begin transmitting beacons for the virtual AP address X that includes the network ID or BSSID for such address X, to allow mobile station 106 to detect this BSSID/ network ID and associate with it. For example, physical AP 104 may associate with the mobile station 106 and assign the virtual AP address X to the mobile station address Z if an association request for virtual AP address X is received by physical AP 104 within a time period after the disassociation request is received by physical AP 104. Otherwise, if an association request is not received within the time period, the virtual AP address X may be assigned by physical AP 104 to another mobile station, or the virtual AP address X may be returned to a pool of addresses (e.g., maintained by the AP 104 or the network controller 112).

In another example embodiment, network controller 112 may coordinate or facilitate the handover from a current physical AP (e.g., physical AP 103) to a new physical AP (e.g., physical AP 104) for mobile station 106. This may allow more (or most) of the association information and related intelligence for handover decisions to be maintained and/or performed by the network controller 112.

For example, network controller 112 may allocate a transferrable virtual AP address to a current physical AP 103. This transferrable virtual AP address may be transmitted or beaconed by the physical AP 103 and then associated with a mobile station 106 when the mobile station 106 associates with the physical AP 103 (or associates with the virtual AP address broadcast by the physical AP 103). Thus, the network controller 112 may allocate a transferrable virtual AP address that will be assigned to an associated mobile station.

The network controller 112 may also store information for facilitating handover for the mobile station 106. For example, network controller 112 may store the mobile station address of mobile station 106, the virtual AP address assigned to the associated mobile station 106, the association state information for the association between the mobile station address and the transferrable virtual AP address for the current physical AP 103, beacon timing information for the beacon transmitted by the current physical AP 103 for the transferrable virtual AP address assigned to the associated mobile station 106, etc. The association state information stored by network controller 112 for the association between the mobile station address and the transferrable virtual AP address (used by current physical AP) may include, for example, capabilities of the current physical AP or the mobile station (such as acceptable modulation schemes, power save mode, or multimedia extension, etc.), data transmission statistics (packet loss rate, signal strengths, etc.), authentication credentials for mobile station and/or AP, security keys, and/or possibly other information.

In an example embodiment, the network controller 112 (or other network entity) may monitor signal strength from the mobile station (e.g., as measured by current physical AP 103 and provided to network controller 112), signal strength as measured by mobile station 106 from current physical AP 103 (and relayed by current AP to network controller 112), or other criteria or measurements. Network controller 112 may also have an understanding of basic network configuration for network 102, traffic loads, etc., and it may be desirable for network controller 112 to centrally allocate resources (physical APs) and virtual AP addresses to mobile stations in an efficient manner, e.g., to provide good service without overloading any single physical AP. At some point, network controller 112 may determine that a handover should be performed for the mobile station 106 from current physical AP 103 to a new physical AP 104.

Thus, in this example embodiment, to perform or facilitate handover, the network controller 112 (or other network entity) may request or instruct the current physical AP 103 and the new physical AP 104 to perform the handover for the mobile station 106 (from old physical AP 103 to new physical AP 104). As part of this handover, network controller 112 (or other network entity) may transfer the transferrable virtual AP address for the mobile station 106 to the new physical AP 104 (e.g., network controller 112 may send a messages(s) to new physical AP 103 and old physical AP 104 notifying them that this virtual AP address, is now being transferred from old physical AP 103 to new physical AP 104 for this mobile station address for mobile station 106). Thus, the network controller 112 may provide the mobile station address and the transferrable virtual AP address assigned to the mobile station address, and an indication that this transferrable virtual AP address is being transferred to new physical AP 104 as part of a handover, although this handover may be transparent or undetectable to mobile station 106, at least in some cases (e.g., where same channel is used before and after handover). The network controller 112 (or other network entity) may also provide additional information to the new physical AP to further facilitate this handover. This information may include, for example, the mobile station address, the association state information for the association between the mobile station address and the virtual AP address for the current physical AP 103, beacon timing information for the beacon transmitted by the current physical AP for the transferrable virtual AP address assigned to the associated mobile station, etc. This information may be provided to the new physical AP (e.g., physical AP 104) to allow the new physical AP 104 to continue communicating with the mobile station using the same virtual AP address, the same capabilities (e.g., modulation schemes, power save mode, multimedia extension) as used by current physical AP 103 for the communication with the mobile station 106, and to transmit or broadcast a beacon for the transferrable virtual AP address at approximately the same time that it was transmitted or broadcast by the current physical AP.

Figure 2:
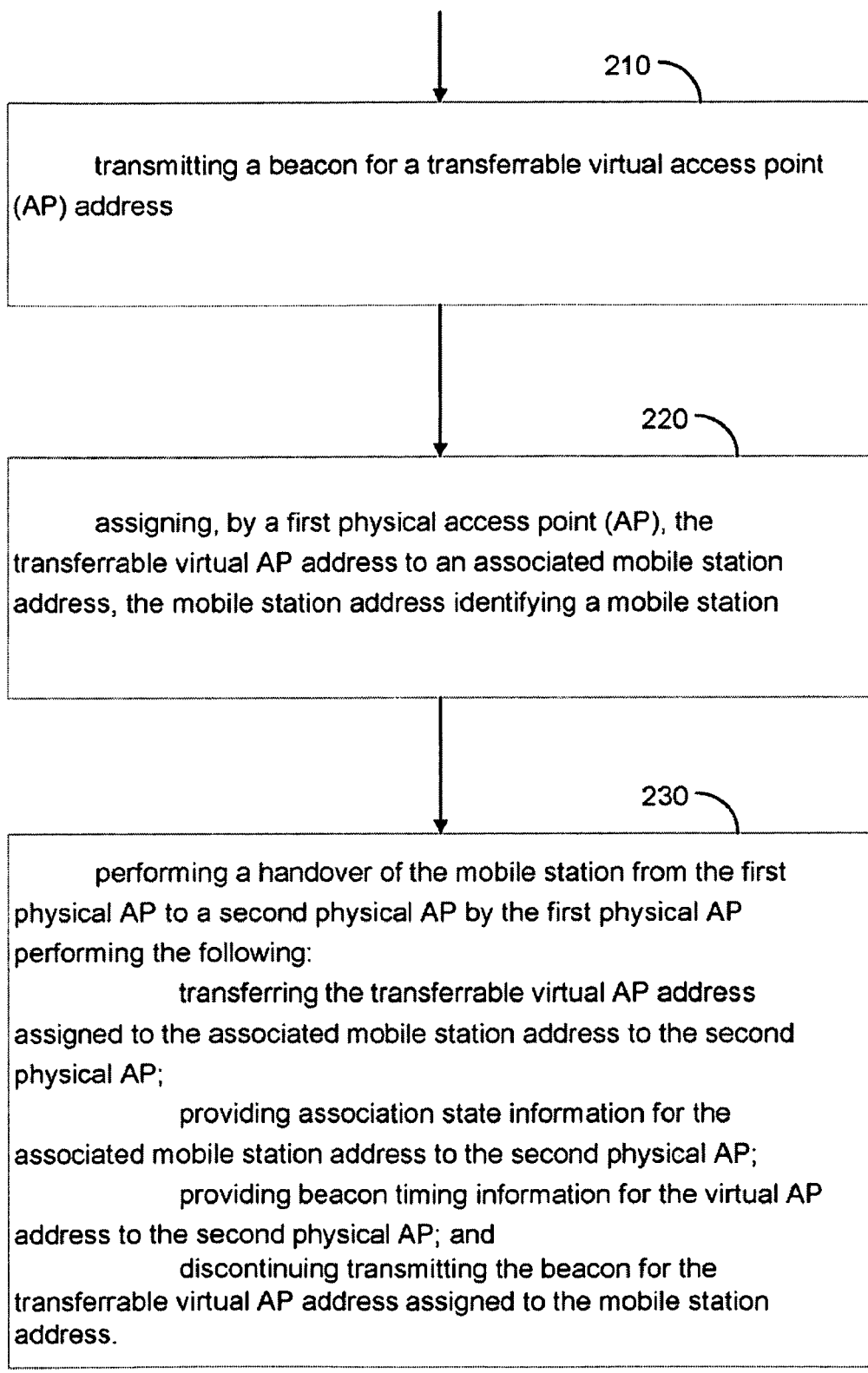
FIG. 2 is a flow chart illustrating operation of a wireless node according to an example embodiment.

FIG. 2 is a flow chart illustrating operation of wireless node (e.g., AP) according to an example embodiment. Operation 210 may include transmitting a beacon for a transferrable virtual access point (AP) address. Operation 220 may include assigning, by a first physical access point (AP), the transferrable virtual AP address to an associated mobile station address, the mobile station address identifying a mobile station. Operation 230 may include performing a handover of the mobile station from the first physical AP to a second physical AP by the first physical AP performing the following: transferring the transferrable virtual AP address assigned to the associated mobile station address to the second physical AP; providing association state information for the associated mobile station address to the second physical AP; providing beacon timing information for the virtual AP address to the second physical AP; and discontinuing transmitting the beacon for the transferrable virtual AP address assigned to the mobile station address.

The method illustrated in FIG. 2 may also include the first physical AP negotiating the handover with the second physical AP. Also, in another example embodiment, the handover may be a network requested handover, e.g., requested by one or more physical APs, or by a network controller.

In an example embodiment of the method illustrated in FIG. 2, operation 210 may include transmitting a beacon for a transferrable virtual access point (AP) address, the beacon including the transferrable virtual AP address and a network ID or basic service set ID (BSSID) corresponding to the transferrable virtual AP address, wherein subsequent beacon transmissions for the transferrable virtual AP address from the first physical AP do not include the network ID or BSSID after the transferrable virtual AP address is assigned to the mobile station address.

In an example embodiment, operation 220 may include: receiving an association request at the first physical AP from the mobile station address for the transferrable virtual AP address; transmitting an association response granting the association request; and assigning, by a first physical access point (AP) in response to the association request, the transferrable virtual AP address to the mobile station address.

In an example embodiment, operation 230 may include performing a handover of the mobile station address from the first physical AP to a second physical AP by the first physical AP, wherein the handover is a network or AP requested handover that is substantially transparent to the mobile station.

In an example embodiment, the providing association state information of operation 230 may include providing association state information for the associated mobile station address to the second physical AP, the association station information may include one or more of: one or more capabilities of the mobile station, data transmission statistics, authentication credentials, a security key.

In an example embodiment, the flow chart of FIG. 2 may further include the first physical AP performing the following after the handover: determining a new transferrable virtual AP address; and transmitting a beacon for the new transferrable virtual access point (AP) address.

In an example embodiment, the determining a new transferrable virtual AP address may include determining a new transferrable virtual AP address from a pool of addresses.

In an example embodiment, the determining a new transferrable virtual AP address may include requesting a new transferrable AP address from a central controller or other network entity (e.g., other AP or other network node), and obtaining the new transferrable virtual AP address from the central controller.

In an example embodiment, the flow chart of FIG. 2 may further include the second physical AP performing the following after the handover: transmitting the beacon for the transferrable virtual access point (AP) address at a time based upon the beacon timing information; and maintaining the association of the mobile station with the transferrable virtual AP address after the handover without performing an association with the mobile station.

In an example embodiment, the flow chart of FIG. 2 may further include the second physical AP performing the following if, after performing the handover, the mobile station requests disassociation with the transferrable virtual AP address: transmitting a beacon for the transferrable virtual access point (AP) address, the beacon including the transferrable virtual AP address and a network ID or basic service set ID (BSSID) corresponding to the transferrable virtual AP address; assigning the transferrable virtual AP address to the mobile station address if an association request is received from the mobile station address for the transferrable virtual AP address within a time period after receipt of the request for disassociation; and, otherwise, if no association request is received from the mobile station for the transferrable virtual AP address within the time period, allowing the transferrable virtual AP address to be assigned to another mobile station or returned to a pool of addresses.

Figure 3:
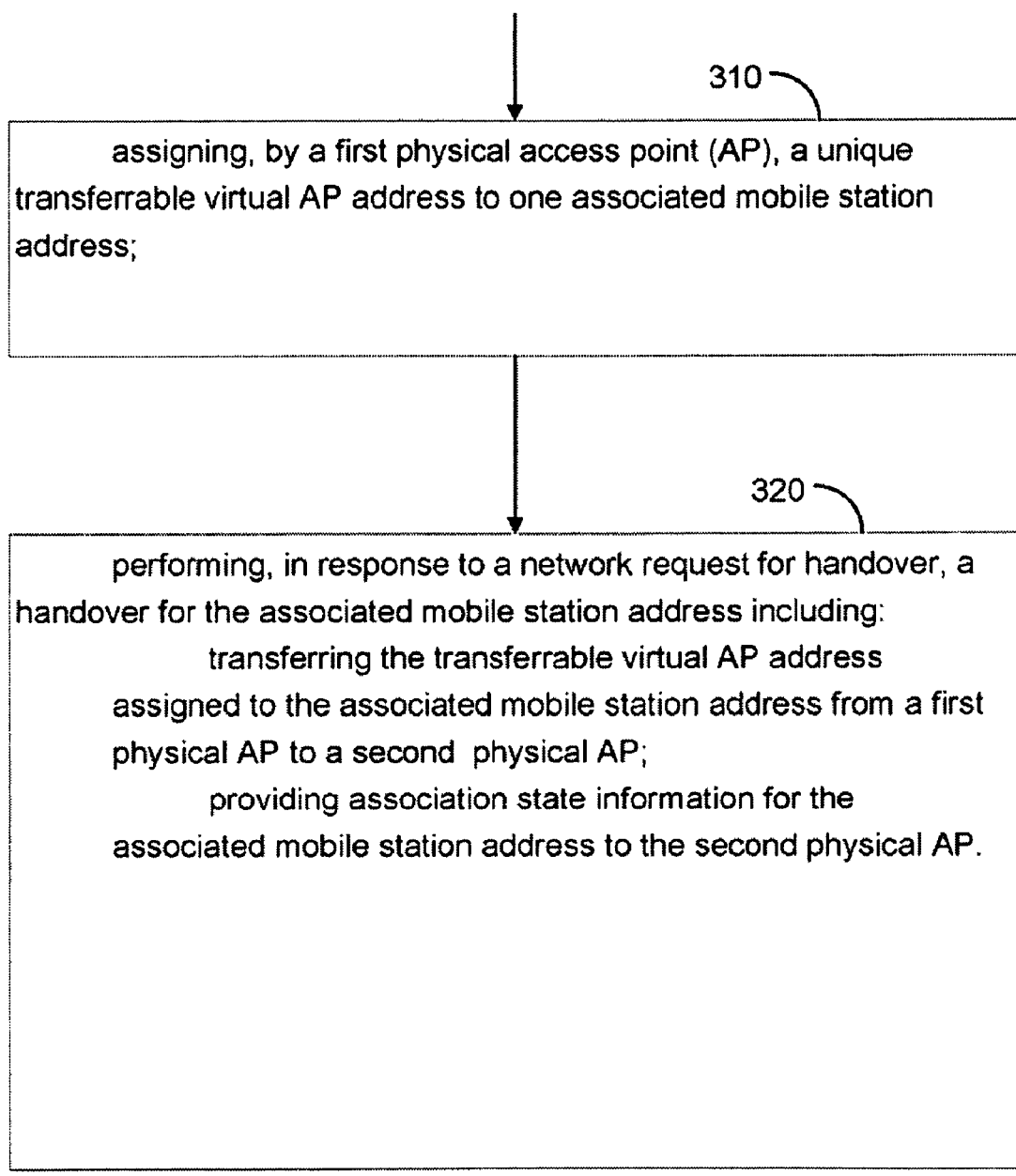
FIG. 3 is a flow chart illustrating operation of a wireless node according to an example embodiment.

FIG. 3 is a flow chart illustrating operation of a wireless node according to an example embodiment. Operation 310 may include assigning, by a first physical access point (AP), a unique transferrable virtual AP address to one associated mobile station address; and, operation 320 may include performing, in response to a network request for handover, a handover for the associated mobile station address including: transferring the transferrable virtual AP address assigned to the associated mobile station address from a first physical AP to a second physical AP; and providing association state information for the associated mobile station address to the second physical AP.

In an example embodiment, operation 320 may also include providing beacon timing information for the transferrable virtual AP address to the second physical AP.

In an example embodiment, operation 320 may also include discontinuing transmitting a beacon for the transferrable virtual AP address.

According to an example embodiment, an apparatus may be provided at a first physical access point (AP) in a wireless network. The apparatus may include a controller or processor; a memory coupled to the controller; and a wireless transceiver coupled to the controller. The apparatus may be adapted to: assign a unique transferrable virtual AP address to one associated mobile station address; and perform, in response to a network request for handover, a handover for the associated mobile station address including: transfer the transferrable virtual AP address assigned to the associated mobile station address to a second physical AP; and provide association state information for the associated mobile station address to the second physical AP.

Figure 4:
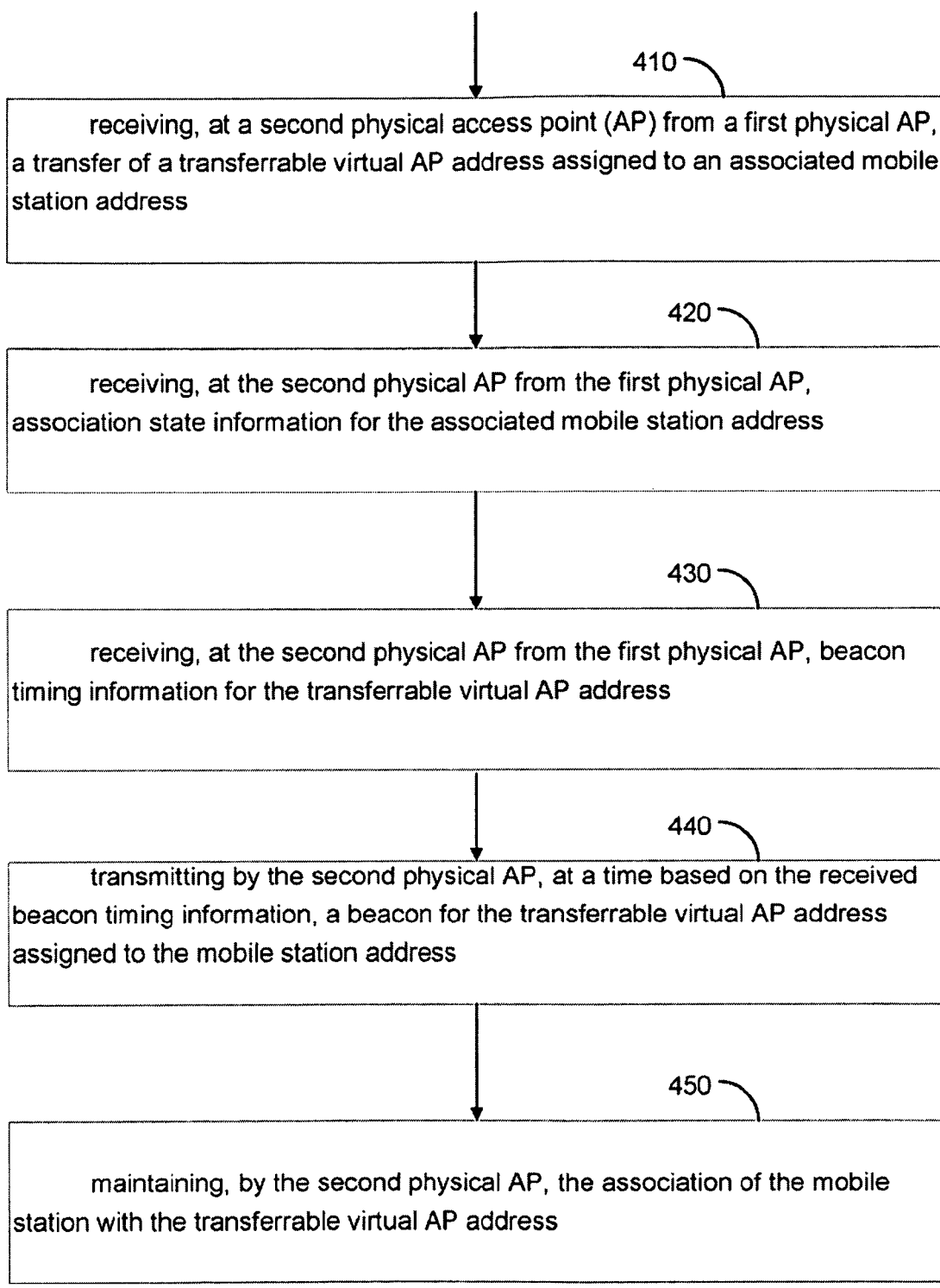
FIG. 4 is a flow chart illustrating operation of a wireless node according to another example embodiment.

FIG. 4 is a flow chart illustrating operation of a wireless node according to another example embodiment. The flow chart of FIG. 4 may illustrate a method of performing a handover for a mobile station in a wireless network. Operation 410 may include receiving, at a second physical access point (AP) from a first physical AP, a transfer of a transferrable virtual AP address assigned to an associated mobile station address. Operation 420 may include receiving, at the second physical AP from the first physical AP, association state information for the associated mobile station address. Operation 430 may include receiving, at the second physical AP from the first physical AP, beacon timing information for the transferrable virtual AP address. Operation 440 may include transmitting by the second physical AP, at a time based on the received beacon timing information, a beacon for the transferrable virtual AP address assigned to the mobile station address. And, operation 450 may include maintaining, by the second physical AP, the association of the mobile station with the transferrable virtual AP address.

In an example embodiment, operation 450 may include maintaining the association and authentication of the mobile station with the transferrable virtual AP address after the handover without performing an association or authentication with the mobile station.

In another example embodiment, operation 420 may include receiving, at the second physical AP from the first physical AP, association state information for the associated mobile station address, the association station information including one or more of: one or more capabilities of the mobile station, data transmission statistics, authentication credentials, a security key.

In another example embodiment, the flow chart of FIG. 4 may further include the second physical AP performing the following if, after performing the handover, the mobile station requests disassociation with the transferrable virtual AP address: transmitting a beacon for the transferrable virtual access point (AP) address, the beacon including the transferrable virtual AP address and a network ID or basic service set ID (BSSID) corresponding to the transferrable virtual AP address; assigning the transferrable virtual AP address to the mobile station address if an association request is received from the mobile station address for the transferrable virtual AP address within a time period after receipt of the request for disassociation; otherwise, if no association request is received from the mobile station for the transferrable virtual AP address within the time period, allowing the transferrable virtual AP address to be assigned to another mobile station or returned to a pool of addresses.

Figure 6:
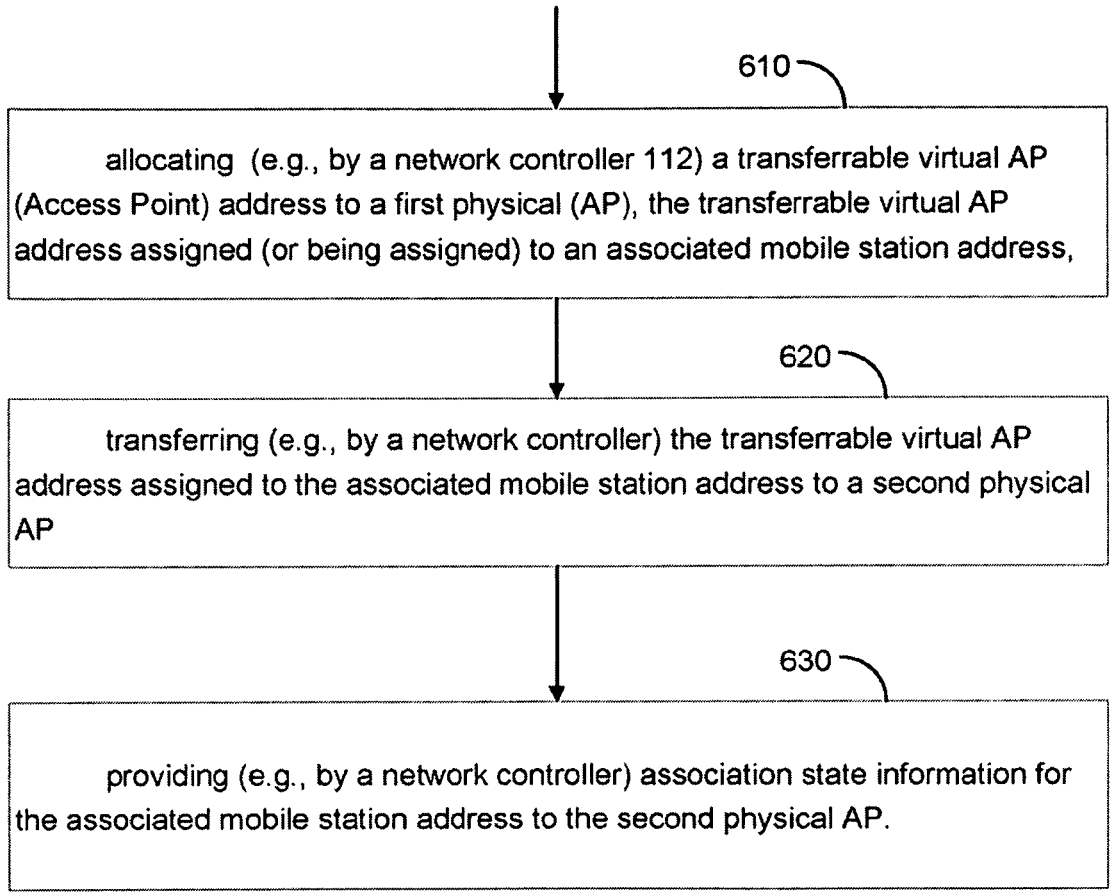
FIG. 6 is a flow chart illustrating operation of a network controller (or other node) according to an example embodiment.

FIG. 6 is a flow chart illustrating operation of a network controller according to an example embodiment. The method may include allocating (610) (e.g., by a network controller 112, or other network entity such as a central controller or another AP) a transferrable virtual AP (Access Point) address to a first physical (AP), the transferrable virtual AP address assigned to an associated mobile station address. For example, the first physical AP may assign this virtual AP address to the mobile station address. The method may also include transferring (620) the transferrable virtual AP address assigned to the associated mobile station address to a second physical AP, and providing (630) association state information for the associated mobile station address to the second physical AP.

The method may further include, for example, providing (e.g., by network controller 112 or other network entity) beacon timing information for the virtual AP address to the second physical AP. The method wherein the transferring (620) may include sending a message from a network controller (e.g., network controller 112) to the first physical AP and the second physical AP indicating that a handover should be performed for the mobile station address from the first physical AP to the second physical AP, the message indicating that the transferrable virtual AP address is being transferred from the first physical AP to the second physical AP as part of the handover for the mobile station.

Figure 5:
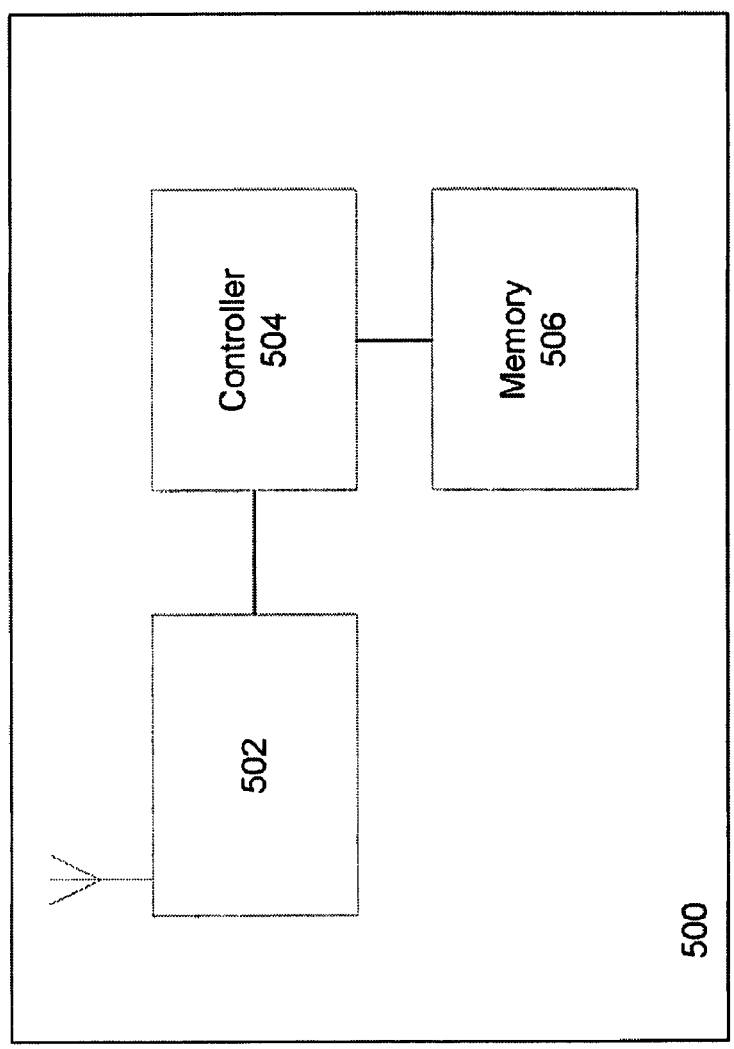
FIG. 5 is a block diagram of a wireless node according to an example embodiment.

FIG. 5 is a block diagram of a wireless node according to an example embodiment. The wireless node 500 may include a wireless transceiver 502, and a controller (or processor) 504, and a memory 506. For example, some operations illustrated in FIGS. 2-4 or described herein, may be performed by a controller 504, under control of software or firmware.

In addition, a storage medium may be provided that includes stored instructions, which when executed by a controller or processor may result in a controller, or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program (s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
  transmitting a beacon for a transferrable virtual access point (AP) address;
  assigning, by a first physical access point (AP), the transferrable virtual AP address to an associated mobile station address, the mobile station address identifying a mobile station;
  performing a handover of the mobile station from the first physical AP to a second physical AP by the first physical AP performing the following:
  transferring the transferrable virtual AP address assigned to the associated mobile station address to the second physical AP;
  providing association state information for the associated mobile station address to the second physical AP;
  providing beacon timing information for the virtual AP address to the second physical AP;
  discontinuing transmitting the beacon for the transferrable virtual AP address assigned to the mobile station address; and
  the first physical AP performing the following after the handover:
    determining a new transferrable virtual AP address;
    transmitting a beacon for the new transferrable virtual access point (AP) address.

2. The method of claim 1 and further comprising the first physical AP negotiating the handover with the second physical AP.

3. The method of claim 1 wherein the handover is a network requested handover.

4. The method of claim 1 wherein the transmitting comprises transmitting a beacon for a transferrable virtual access point (AP) address, the beacon including the transferrable virtual AP address and a network ID or basic service set ID (BSSID) corresponding to the transferrable virtual AP address, wherein subsequent beacon transmissions for the transferrable virtual AP address from the first physical AP do not include the network ID or BSSID after the transferrable virtual AP address is assigned to the mobile station address.

5. The method of claim 1 wherein the assigning comprises:
  receiving an association request at the first physical AP from the mobile station address for the transferrable virtual AP address;
  transmitting an association response granting the association request; and
  assigning, by a first physical access point (AP) in response to the association request, the transferrable virtual AP address to the mobile station address.

6. The method of claim 1 wherein the performing a handover comprises performing a handover of the mobile station address from the first physical AP to a second physical AP by the first physical AP, wherein the handover is a network or AP requested handover that is substantially transparent to the mobile station.

7. The method of claim 1 wherein the providing comprises providing association state information for the associated mobile station address to the second physical AP, the association station information including one or more of: one or more capabilities of the mobile station, data transmission statistics, authentication credentials, a security key.

8. The method of claim 1 wherein the determining a new transferrable virtual AP address comprises determining a new transferrable virtual AP address from a pool of addresses.

9. The method of claim 1 wherein the determining a new transferrable virtual AP address comprises:
   requesting a new transferrable virtual AP address from a central controller in a wireless network; and
   obtaining the new transferrable virtual AP address from the central controller.

10. The method of claim 1 and further comprising the second physical AP performing the following after the handover:
    transmitting the beacon for the transferrable virtual access point (AP) address at a time based upon the beacon timing information; and
    maintaining the association of the mobile station with the transferrable virtual AP address after the handover without performing an association with the mobile station.

11. The method of claim 10 wherein the maintaining comprises maintaining the association and authentication of the mobile station with the transferrable virtual AP address after the handover without performing an association or authentication with the mobile station.

12. The method of claim 1 and further comprising the second physical AP performing the following if, after performing the handover, the mobile station requests disassociation with the transferrable virtual AP address:
    transmitting a beacon for the transferrable virtual access point (AP) address, the beacon including the transferrable virtual AP address and a network ID or basic service set ID (BSSID) corresponding to the transferrable virtual AP address;
    assigning the transferrable virtual AP address to the mobile station address if an association request is received from the mobile station address for the transferrable virtual AP address within a time period after receipt of the request for disassociation;
    otherwise, if no association request is received from the mobile station for the transferrable virtual AP address within the time period, allowing the transferrable virtual AP address to be assigned to another mobile station or returned to a pool of addresses.

13. A method comprising: receiving an association request at a first physical AP from a mobile station address for a transferrable virtual AP address; transmitting an association response granting the association request to associate the mobile station address; assigning, by the a first physical access point (AP), the a unique transferrable virtual AP address to the one associated mobile station address; performing, in response to a network request for handover, a handover for the associated mobile station address including: transferring the transferrable virtual AP address assigned to the associated mobile station address from a first physical AP to a second physical AP; providing association state information for the associated mobile station address to the second physical AP; and determining a new transferrable virtual AP address.

14. The method of claim 13 wherein the performing a handover further includes providing beacon timing information for the transferrable virtual AP address to the second physical AP.

15. The method of claim 13 and wherein the performing the handover further comprises discontinuing transmitting a beacon for the transferrable virtual AP address.

16. An apparatus provided at a first physical access point (AP) in a wireless network comprising:
    a controller;
    a memory coupled to the controller; and
    a wireless transceiver coupled to the controller;
    the apparatus being adapted to:
    assign a unique transferrable virtual AP address to one associated mobile station address; and
    perform, in response to a network request for handover, a handover for the associated mobile station address including:
    transfer the transferrable virtual AP address assigned to the associated mobile station address to a second physical AP;
    provide association state information for the associated mobile station address to the second physical AP; and
    determine a new transferrable virtual AP address.

17. A method of performing a handover for a mobile station in a wireless network, the method comprising:
    receiving, at a second physical access point (AP) from a first physical AP, a transfer of a transferrable virtual AP address assigned to an associated mobile station address;
    receiving, at the second physical AP from the first physical AP, association state information for the associated mobile station address;
    receiving, at the second physical AP from the first physical AP, beacon timing information for the transferrable virtual AP address;
    transmitting by the second physical AP, at a time based on the received beacon timing information, a beacon for the transferrable virtual AP address assigned to the mobile station address; and
    maintaining, by the second physical AP, the association of the mobile station with the transferrable virtual AP address; and
    wherein the maintaining comprises maintaining the association and authentication of the mobile station with the transferrable virtual AP address after the handover without performing an association or authentication with the mobile station.

18. The method of claim 17 wherein the receiving, at the second physical AP from the first physical AP, association state information comprises receiving, at the second physical AP from the first physical AP, association state information for the associated mobile station address, the association station information including one or more of: one or more capabilities of the mobile station, data transmission statistics, authentication credentials, a security key.

19. The method of claim 17 and further comprising the second physical AP performing the following if, after performing the handover, the mobile station requests disassociation with the transferrable virtual AP address:
    transmitting a beacon for the transferrable virtual access point (AP) address, the beacon including the transferrable virtual AP address and a network ID or basic service set ID (BSSID) corresponding to the transferrable virtual AP address;
    assigning the transferrable virtual AP address to the mobile station address if an association request is received from the mobile station address for the transferrable virtual AP address within a time period after receipt of the request for disassociation;

otherwise, if no association request is received from the mobile station for the transferrable virtual AP address within the time period, allowing the transferrable virtual AP address to be assigned to another mobile station or returned to a pool of addresses.

20. A method comprising: allocating a transferrable virtual AP (Access Point) address to a first physical (AP), the transferrable virtual AP address being assigned to an associated mobile station address; sending a message from a network controller to the first physical AP and the second physical AP indicating that a handover should be performed for the mobile station address from the first physical AP to the second physical AP, the message indicating that the transferrable virtual AP address is being transferred from the first physical AP to the second physical AP as part of the handover for the mobile station; transferring the transferrable virtual AP address assigned to the associated mobile station address to a second physical AP; and providing association state information for the associated mobile station address to the second physical AP; and determining a new transferrable virtual AP address.

21. The method of claim 20 and further comprising providing beacon timing information for the virtual AP address to the second physical AP.

* * * * *

UNITED STATES PATENT AND TRADEMARK OFFICE
CERTIFICATE OF CORRECTION

PATENT NO. : 8,223,721 B2
APPLICATION NO. : 12/277938
DATED : July 17, 2012
INVENTOR(S) : Jan Erik Johan Berglund Page 1 of 1

It is certified that error appears in the above-identified patent and that said Letters Patent is hereby corrected as shown below:

In column 13, line 49, in claim 13, delete "the a" and insert -- the --, therefor.

In column 13, line 50, in claim 13, delete "the a" and insert -- the --, therefor.

Signed and Sealed this
First Day of January, 2013

David J. Kappos
*Director of the United States Patent and Trademark Office*